March 20, 1962
R. J. MATTESON
3,025,696
SURFACE POSITION INDICATOR HAVING
MOVABLE SENSING MEANS
Filed April 30, 1956
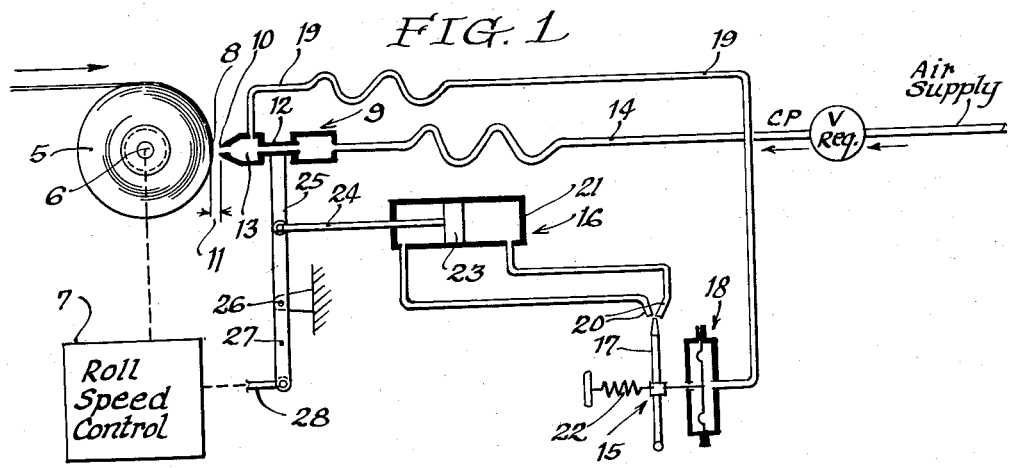
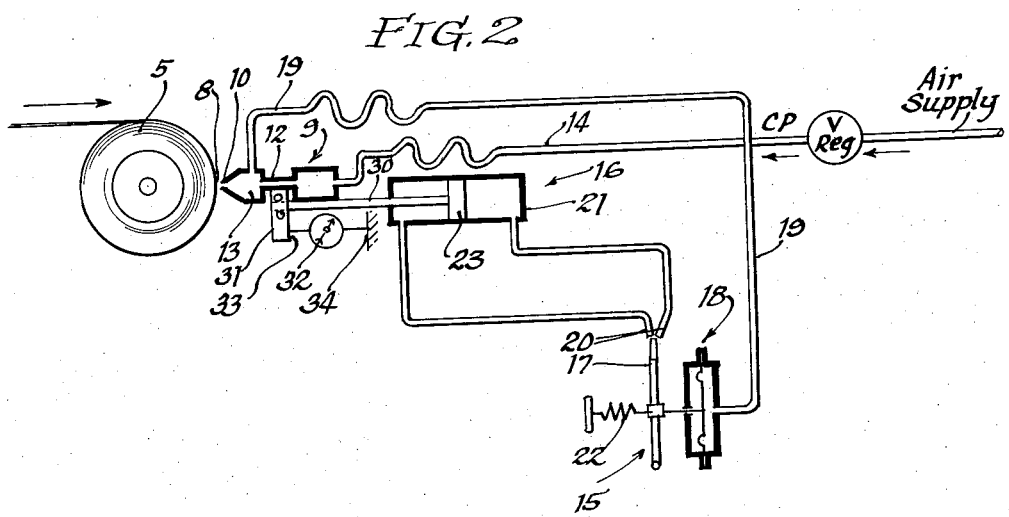
INVENTOR.
Richard J. Matteson
BY
Attorneys & # United States Patent Office 3,025,696
Patented Mar. 20, 1962

3,025,696
SURFACE POSITION INDICATOR HAVING MOVABLE SENSING MEANS
Richard J. Matteson, Ridgewood, N.J., assignor to GPE Controls, Inc., a corporation of Illinois
Filed Apr. 30, 1956, Ser. No. 581,618
4 Claims. (Cl. 73—37.6)

The present invention relates to detection and indication of positions of surfaces in directions extended substantially normal to the surface at the particular location of such detection. More particularly, the invention relates to the field of non-contacting surface position sensing, which may be required for various reasons, as to avoid marring of the surface, or to eliminate damage or friction between a moving surface and stationary detector. Additionally the invention is concerned with indication of the location of the surface by the magnitude of a condition that is suitable for employment as a control signal to regulate apparatus for performing various functions, as for pure indication or control of apparatus that may or may not affect the position of the surface of which the position is detected.

In the accompanying drawings:

FIG. 1 is a schematic view of a system arranged in accordance with the invention, and arranged to vary speed of a rotating roll on which material is being wound, in relation to diameter of the roll as indicated by the instant position of a portion of its surface.

FIG. 2 is a similar view of a slightly modified form of system, shown as providing only for indication of the roll diameter.

In FIG. 1, the surface of which the position is to be sensed and indicated is the exterior surface of a roll 5 of material being wound onto a roller 6 which is driven by variable speed mechanism 7. The location of a surface portion 8 serves as a measure of the diameter of roll 5, and may be used for control of rotational speed of roll 5, for example to maintain constant the linear speed of the material being wound thereon. To provide for constant sensing and indication of the position of surface portion 8, preferably along a line extended normal to the roll surface at point of sensing, and without physical contact between the surface and a detector structure, a back pressure detector 9 is employed and is combined with servo mechanism in such fashion as to maintain the extreme portion 10 of the detector that is most adjacent roll surface portion 8, as to maintain constant a preselected spacing distance, indicated at 11, between them.

Detector 9 in effect is a discharge nozzle for directing a stream of pressurized fluid, as air, toward surface portion 8 in the direction of a line extended substantially normal thereto. It includes an internal passage system for delivery of the fluid at constant volume rate to a discharge orifice in extreme portion 10, a flow restriction 12 being provided in the flow path to a signal pressure chamber 13 that is in immediate communication with the discharge orifice, so that air delivered at constant pressure through a line 14, and discharged against surface portion 8, will develop in chamber 13 a back pressure the magnitude of which is a function of spacing of detector portion 10 from surface portion 8. Pressure so developed in chamber 13 is used as a signal pressure for servo mechanism that adjusts the position of detector 9 to maintain spacing distance 11 constant, the position of detector 9 constituting the primary condition indicative of the position of surface portion 8.

The servo mechanism is shown as comprising a jet pipe relay regulator assembly 15 and a piston and cylinder power unit assembly 16 the piston of which is linked to detector 9 for positioning it as described. Regulator 15 comprises a jet pipe 17 pivoted to swing to positions corresponding to magnitude of signal pressure developed in detector chamber 13, and translated to a force by a diaphragm assembly 18 to which the pressure is transmitted by signal pipe 19. In swinging the relative degrees of registration of a fluid discharge orifice in the tip of pipe 17 with the different ones of two receiver ports 20 are changed, and corresponding changes occur in relation of magnitudes of pressures developed in the ports 20 and the different ends of the servomotor cylinder 21 by a jet of pressurized fluid discharged by pipe 17. In case of the non-equal registration of the jet pipe orifice with ports 20, a condition arising from departure of spacing 11 from a distance selected by the setting of a return spring 22 of the regulator assembly, power unit piston 23 will move, and through linkage 24, 25, being connected to detector 9, will correspondingly move the latter. The system factors are so related that it operates to maintain spacing 11 constant and of preselected length.

Element 25 of the transmission linkage is shown as a lever, fulcrumed at 26 and having an arm 27 connected to the control element 28 of speed control mechanism 7, whereby the speed of drive of roll support 6 may be varied with changing roll diameter, as indicated by the position of detector 9, to maintain constant the linear speed of the material undergoing winding.

In FIG. 2 the detector and relay mechanism correponds to the corresponding assemblies of FIG. 1 and the same reference numerals are applied. In the FIG. 2 arrangement, however, for greater accuracy, obtained by eliminating a slightly arcuate movement of detector 9 arising from its support on pivoted lever element 25, in FIG. 2 detector 9 is directly supported by the piston rod 30 of power unit 16, by a carriage block 31, so that movement of detector 9 is accurately linear. A high precision gap distance measurement gauge 32 is interposed between an extension 33 of block 31 and a fixed reference surface 34, and thereby is obtained high precision indication of the location of roll surface portion 8.

From the foregoing will be understood the advantages, types of arrangements and modes of operation of mechanisms that may be designed in exploitation of the invention herein disclosed, and it is to be understood that variations, changes and modifications of the specific exemplary disclosure herein made may be restored to within the scope of the invention as defined by the appended claims.

I claim:

1. In a control arrangement wherein positional indication of a moving surface along a line extending substantially normal to the surface is continuously rendered, the combination including an operating means to directionally move said surface, a movable pressure fluid discharge means maintained in predesignated proximity to the moving surface and adapted to develop a back pressure signal indicative of the position of the moving surface relative to the discharge means, a regulating means arranged to receive the pressure signal from the pressure fluid discharge means, and a control means arranged for control of the operating means, said regulating means having a pressure means sensitive to change of magnitude of said pressure signal to cause operation of a servo mechanism which is adapted to regulate operation of said control means and to maintain said pressure fluid discharge means in said predesignated proximity.

2. In a control arrangement wherein positional indication of a moving surface along a line extending substantially normal to the surface is continuously rendered, the combination including an operating means to directionally move said surface, a movable pressure fluid discharge means for continuously discharging a stream of fluid at said moving surface, said pressure fluid discharge means including a chamber wherein is developed a signal pressure the magnitude of which depends upon the distance of the pressure fluid discharge means from said moving surface, a regulating means arranged to receive from the pressure fluid discharge means an indication of signal pressure, and a control means operable for control of the operating means, said regulating means having a pressure means sensitive to change of magnitude of said pressure signal to cause operation of a servo mechanism which is adapted to regulate operation of the control means and to maintain said pressure fluid discharge means at a given distance from the moving surface.

3. In a control arrangement according to claim 2, wherein said servo mechanism includes a power unit assembly operably arranged to simultaneously move said pressure fluid discharge means and to operate the control means.

4. In a control arrangement according to claim 3, wherein said power unit assembly is operated by a jet pipe relay regulator responsive to an indication of signal pressure received from said pressure fluid discharge means.

References Cited in the file of this patent

UNITED STATES PATENTS

| | | |
|---|---|---|
| 2,398,958 | Pellettere | Apr. 23, 1946 |
| 2,539,131 | Gundersen et al. | Jan. 23, 1951 |